(12) United States Patent
Garcia (10) Patent No.: US 11,794,537 B2
(45) Date of Patent: Oct. 24, 2023

(54) TRAILER COUPLER RISER

(71) Applicant: U-Haul International, Inc., Phoenix, AZ (US)

(72) Inventor: Marco Garcia, Chandler, AZ (US)

(73) Assignee: U-HAUL INTERNATIONAL, INC., Phoenix, AZ (US)

( * ) Notice: Subject to any disclaimer, the term of this patent is extended or adjusted under 35 U.S.C. 154(b) by 0 days.

(21) Appl. No.: 17/453,366

(22) Filed: Nov. 3, 2021

(65) Prior Publication Data

US 2023/0139691 A1    May 4, 2023

(51) Int. Cl.
*B60D 1/46* (2006.01)
*B60D 1/06* (2006.01)

(52) U.S. Cl.
CPC . *B60D 1/46* (2013.01); *B60D 1/06* (2013.01)

(58) Field of Classification Search
CPC ...................................................... B60D 1/46
See application file for complete search history.

(56) References Cited

U.S. PATENT DOCUMENTS

| | | | |
|---|---|---|---|
| 2,847,232 A | 8/1958 | Graham | |
| 5,354,087 A | 10/1994 | Head | |
| 6,010,142 A * | 1/2000 | McCoy | B60D 1/485 |
| | | | 280/491.5 |
| 6,341,795 B1 | 1/2002 | Zerkel | |
| 7,055,845 B1 | 6/2006 | Putnam | |
| 8,534,695 B2 * | 9/2013 | Columbia | B60D 1/46 |
| | | | 280/514 |
| 8,979,112 B2 * | 3/2015 | Weipert | B60D 1/54 |
| | | | 280/491.5 |
| 9,193,234 B1 * | 11/2015 | Angel | B60D 1/46 |
| 9,199,520 B2 * | 12/2015 | Weipert | B60D 1/46 |
| 11,292,305 B2 * | 4/2022 | Strickland | B60D 1/06 |
| 11,345,200 B2 * | 5/2022 | Draper | B60D 1/24 |
| 2012/0119467 A1 | 5/2012 | Svihla | |
| 2022/0396109 A1 * | 12/2022 | Shaffer | B60D 1/44 |

FOREIGN PATENT DOCUMENTS

CN         106335332 B   *   6/2018

* cited by examiner

*Primary Examiner* — Kevin Hurley
(74) *Attorney, Agent, or Firm* — Richard E. Oney; Venjuris, P.C.

(57) ABSTRACT

An adapter for a trailer coupler assembly includes an elongated riser member configured to be removably mounted to a vertical channel of a trailer coupler. The riser member has a transverse cross-section generally in the shape of an I-beam having a first channel portion and an opposing second channel portion. The first channel portion includes a generally U-shaped transverse cross-section and is configured to be removably mounted to a vertical channel of a trailer coupler assembly at one of a plurality of longitudinal positions along a length of the vertical channel of the trailer coupler assembly. The opposing second channel portion includes a generally U-shaped transverse cross-section configured to hold a trailer coupler.

22 Claims, 7 Drawing Sheets

TRAILER COUPLER RISER

BACKGROUND

This invention relates generally to hitch assemblies for coupling a trailer to a towing vehicle. More specifically, the invention relates to a removable adapter for a channel mount trailer coupler that enables a user to couple the trailer to a towing vehicle regardless of the relative heights of the trailer and the towing vehicle.

Automobiles, trucks and other vehicles are regularly equipped for towing trailers. In doing so, it is important that the trailer be level, rather than at an angle with respect to the towing vehicle, regardless of the relative heights of the towing vehicle and the trailer. Previously, for towing vehicles that have a high ground clearance, such as "lifted" trucks, this level connection has been achieved by using a using a ball mount with a relatively large drop such that the hitch ball is disposed well below the draw bar of the of the ball mount and the receiver tube mounted on the vehicle frame. This solution effectively brings the ball mount down to the level of the trailer coupler. For heavy-duty towing, such as towing commercial trailers, this solution presents a number of drawbacks. The moment arm associated with the dropped ball mount creates an extra load on the ball mount and hitch system, which reduces the towing capacity for the hitch components in comparison to a straight ball mount without a drop. To address this issue, dropped ball mounts must be significantly reinforced, and consequently are significantly more expensive than straight ball mounts. For heavier commercial trailers, such dropped ball mounts may not have an adequate tow rating.

It is an object of the present invention to provide a trailer coupling device with which a towed vehicle, such as a trailer, can effectively and safely be connected to a towing vehicle regardless of the relative heights of the trailer and the towing vehicle.

It is still another object of the present invention to provide such an apparatus that can be used to tow heavy trailers, such as commercial trailers, and that can be used with relatively high towing vehicles, including "lifted" trucks.

It is another object of the invention to provide an apparatus that can readily be used to couple a trailer to a tall towing vehicle so that there is a more direct horizontal (or "neutral") drawbar pull, which reduces the load on the ball mount and hitch system.

It is yet another object of the present invention to provide an apparatus that can be easily removed when not needed, such as when coupling the trailer to a standard-height tow vehicle.

It is another object of the present invention to provide such an apparatus that is relatively easy to manufacture and to use.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided an adapter for a trailer coupler assembly of a vehicle to be towed. The adapter includes an elongated riser member configured to be removably mounted to a vertical channel of a trailer coupler assembly. The riser member has a transverse cross-section generally in the shape of an I-beam having a first channel portion and an opposing second channel portion. The first channel portion includes a generally U-shaped transverse cross-section and is configured to be removably mounted to a vertical channel of a trailer coupler assembly at one of a plurality of longitudinal positions along a length of the vertical channel of the trailer coupler assembly. The opposing second channel portion includes a generally U-shaped transverse cross-section configured to hold a trailer coupler.

In some embodiments, the first channel portion includes two opposing first channel side walls and a first channel inner wall, and the first channel portion defines a first channel opening facing outward from the first channel inner wall. In some embodiments, the second channel portion includes two opposing second channel side walls and a second channel inner wall, and the second channel portion defines a second channel opening facing outward from the second channel inner wall.

In some embodiments, the transverse cross-section of the first channel portion is disposed about a first channel center line, the transverse cross-section of the second channel portion is disposed about a second channel center line, and the first channel center line and the second channel center line are offset from each other. In some embodiments, the first channel portion includes two opposing first channel sidewalls, each of which includes a plurality of transverse holes spaced longitudinally along the length of the first channel portion, and each of the plurality of transverse holes in one of the first channel sidewalls is transversely registered with one of the plurality of transverse holes in the opposing first channel sidewall. In some embodiments, each of the first riser channel portion and the second riser channel portion has a width corresponding to the width of the vertical channel of the trailer coupler assembly.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

DETAILED DESCRIPTION

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description that follows is to be understood as a broad, teaching disclosure directed to persons of ordinary skill in the appropriate arts, and not as limiting upon the invention.

It will be appreciated that terms such as "forward," "rearward," "upper," "inner," "outer," "vertical," "horizontal," "bottom," "below," "top," "side," "inwardly," "outwardly," "downwardly" and "lower" and other positional descriptive terms used in this specification are used merely for ease of description and refer to the orientation of the referenced components as shown in the figures. It should be understood that any orientation of the components described herein is within the scope of the present invention.

Figure 1:
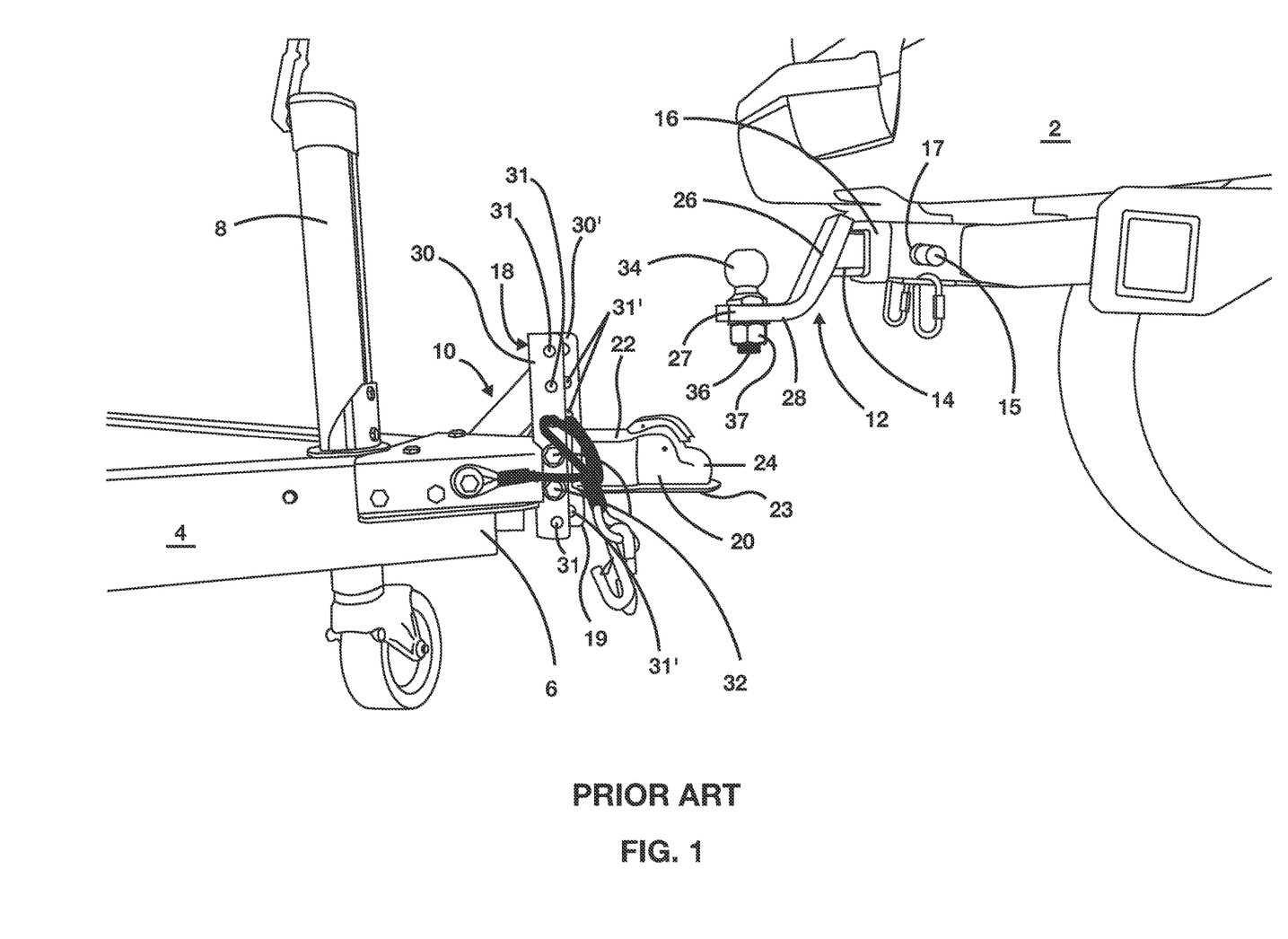
FIG. 1 is a side perspective view of a towing vehicle with a dropped hitch ball mount and a trailer with a prior art vertical channel coupler assembly that includes a ball and socket coupler mounted to vertical channel on the trailer tounge.

For purposes of explanation, and to further assist in the understanding of this invention, a brief description of the operation of a standard previously-known tow hitch assembly that includes a vertical channel trailer coupler assembly follows. Such couplers are used for relatively high weight capacity towing, such as for construction, cargo and livestock trailer applications. FIG. 1 illustrates one embodiment of such a standard channel mount trailer coupler assembly 10, which utilizes a vertical, U-shaped channel 18 with the open side of the channel facing forward for hitching a trailer 4 (or other vehicle to be towed) to a towing vehicle 2 (such as a truck or sport utility vehicle). The channel mount coupler assembly 10 includes a coupler 20 mounted to the vertical channel 18, which in turn is mounted to the trailer tongue 6 to form an integrated frame unit. The vertical channel 18 has two opposing side walls 30, 30' and a forward facing channel opening 19 for receiving the coupler 20. Each of the vertical channel side walls 30, 30' has a series of transverse holes 31, 31' that are suitably spaced at vertical intervals, and are horizontally registered with the holes on the opposing side wall 30', 30, to receive pins or bolts 32 by which the coupler 20 can be secured to the vertical channel 18 at different heights.

Still referring to FIG. 1, the coupler 20 has a coupler body 22 with a ball-shaped coupler socket 24 that has a bottom coupler socket opening 23, which allows the insertion of a hitch ball 34 into the coupler socket 24 to hitch the trailer 4 to the towing vehicle 2. The hitch ball 34 is commonly affixed to the rear end of the tow vehicle 2 utilizing a hitch ball assembly 12 that can support the tongue weight of the trailer 4. To couple the trailer 4 to the towing vehicle 2, the trailer tongue 6 is raised above the hitch ball 34—such as by using a trailer jack 8—so that the coupler socket 24 can be lowered from an elevated height onto the hitch ball 34. As the coupler socket 24 is lowered, the hitch ball 34 advances into the coupler socket 24 through the coupler socket opening 23 until it seats within the coupler socket 24. Typically, such couplers incorporate a retaining mechanism for securing the hitch ball 34 in a retention or coupled position within the coupler socket 24. The retaining mechanism commonly includes a latching mechanism. When properly set in a closed position, the latching mechanism provides a retaining force between the hitch ball 34 and coupler socket 24, thereby securing the trailer 4 to the towing vehicle 2. One type of such a ball-and-socket coupler is a self-latching coupler, which automatically latches when the trailer coupler is lowered onto the hitch ball. An example of such a self-latching coupler is the EZ Latch coupler marketed by Demco Manufacturing Co. of Boyden, Iowa.

Still referring to FIG. 1, the hitch ball assembly 12 includes a hitch ball mount 28 that is generally L-shaped and has a generally vertical leg 26 and a generally horizontal leg 27. The hitch ball mount 28 is supported by a draw bar 14 that is sized and shaped to closely fit within a receiver 16 mounted to the towing vehicle 2. The hitch ball mount 28 is considered a dropped hitch ball mount because the ball 34 is lower than the top of the hitch receiver 16. The hitch ball 34 has a threaded shank 36 that is removably mounted to the hitch ball mount horizontal leg 27 with a hitch ball nut 37. Because the hitch ball 34 is removable, hitch balls of various sizes (e.g., 2", 2 ⅝" or another size) can be used. As is known in the art, the draw bar 14 has side holes (not shown) for receiving a lateral hitch pin 15. When the draw bar 14 is inserted into the receiver 16, it can be longitudinally positioned so that the draw bar side holes align with corresponding receiver side holes 17. Once aligned, the hitch pin 15 can be inserted through the draw bar side holes (not shown) and the aligned receiver side holes 17 to prevent the draw bar 14 from moving longitudinally within the receiver 16. The hitch pin can be held in place by a hitch pin clip (not shown), as is known in the art, to prevent lateral forces from removing the hitch pin 15 from the side holes 17.

Having described a known vertical channel trailer coupler assembly, the features of an adapter according to the present invention will now be described. The adapter includes a channel riser (or vertical extension member) that can be mounted to a standard-size vertical channel trailer coupler as shown in FIG. 2 below.

Figure 2:
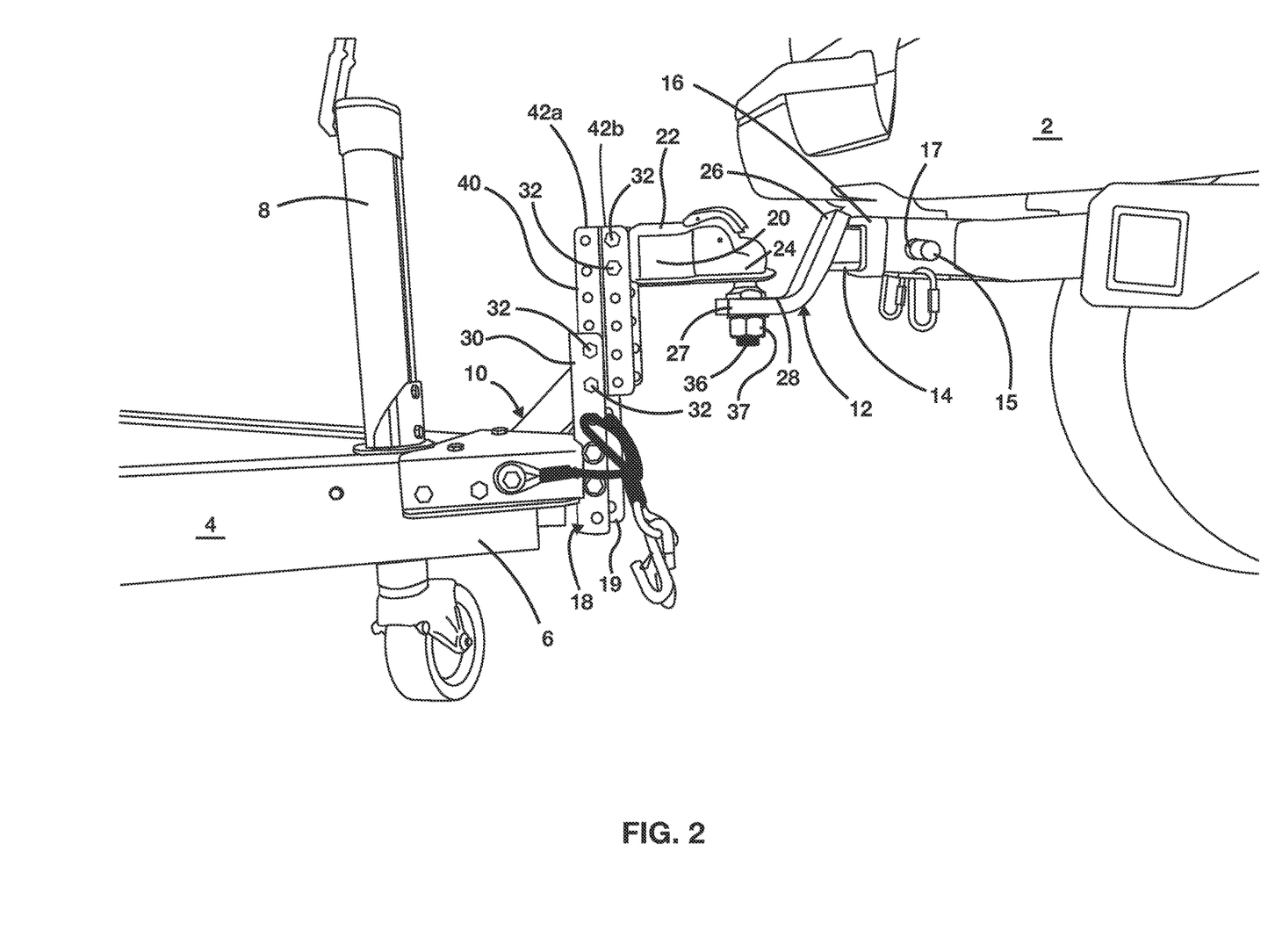
FIG. 2 is a side elevation view of the tow hitch assembly of FIG. 1 wherein the trailer coupler assembly has been modified by adding a channel riser according to the present invention.
Figure 3:
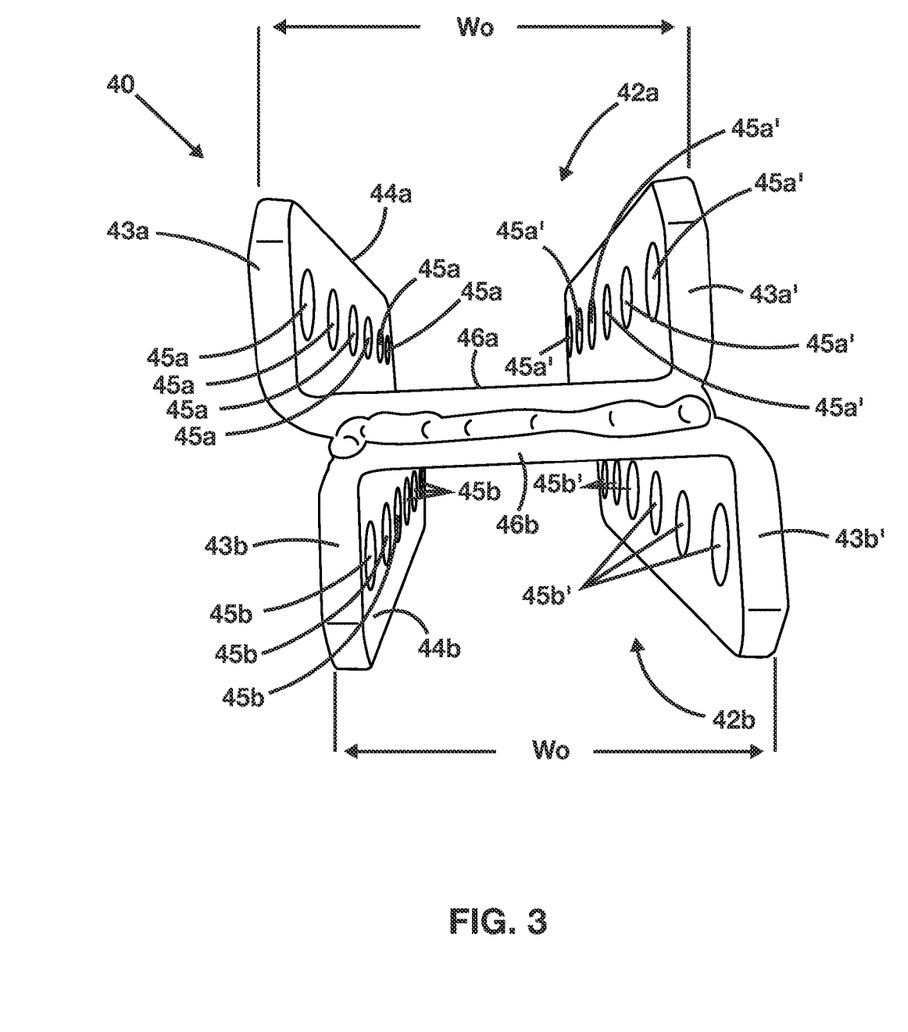
FIG. 3 is a top perspective view of the channel riser of FIG. 2.

FIG. 2 illustrates one embodiment of a channel riser 40 according to the present invention shown mounted to a vertical channel trailer coupler 10 of the type shown in FIG. 1. The riser 40 allows the coupler 20 to be mounted at a selected height above the top of the forward-facing vertical channel 18. This feature enables a user to couple the trailer 4 to a tall tow vehicle 2 (such as one that has been modified with a lift kit or oversized tires) using a standard straight hitch on the tall tow vehicle rather than using a drop hitch, which is more expensive and has reduced towing capacity compared to the straight hitch. The riser 40 can be removed from the vertical channel 18. Thus, if the user does not need the riser's extended height (such as for a towing application involving a tow vehicle of a standard height) and the user does not want to navigate climbing over or around the riser 40 when coupling the trailer to the standard-height tow vehicle, the user can simply remove the riser 40.

Figure 4:
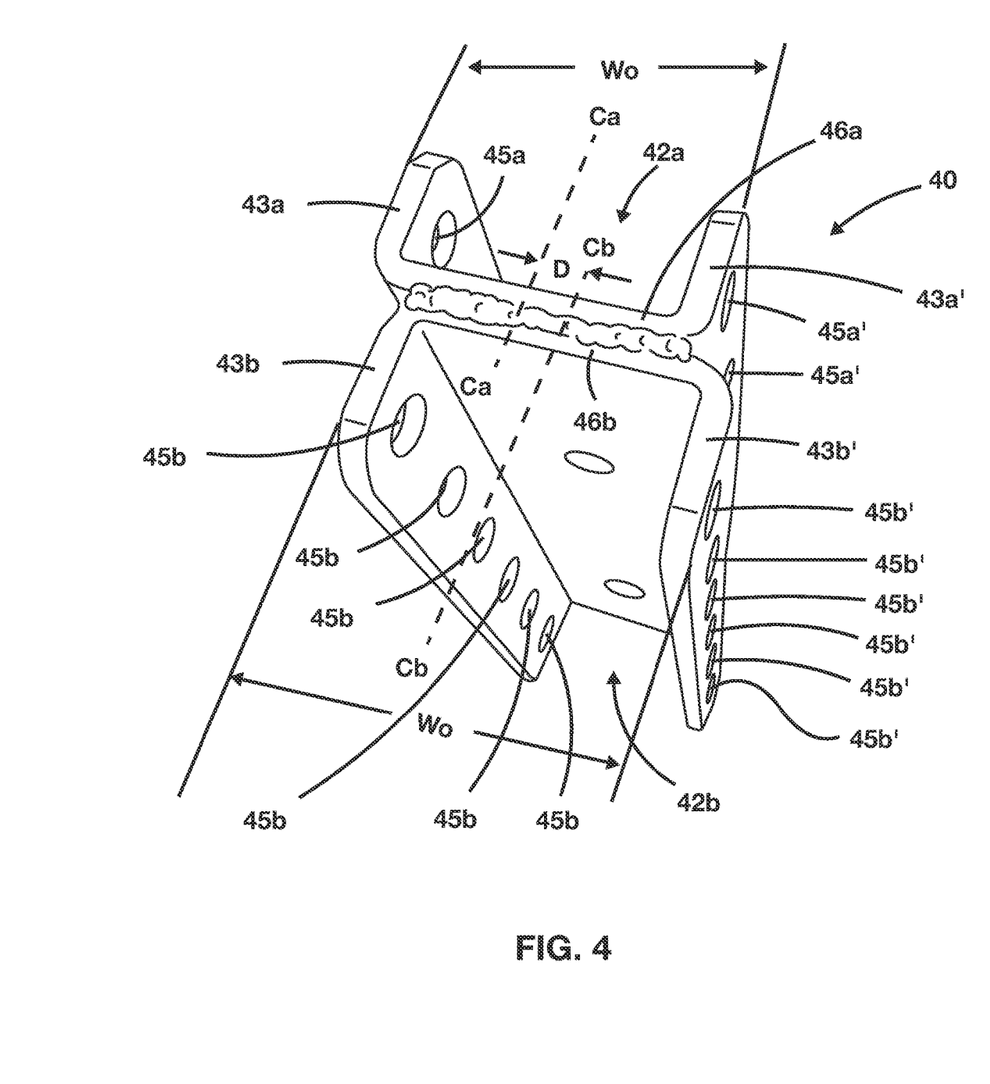
FIG. 4 is another perspective view of the channel riser of FIG. 2 showing the centerlines of the first and second riser channel portions offset from each other.
Figure 5:
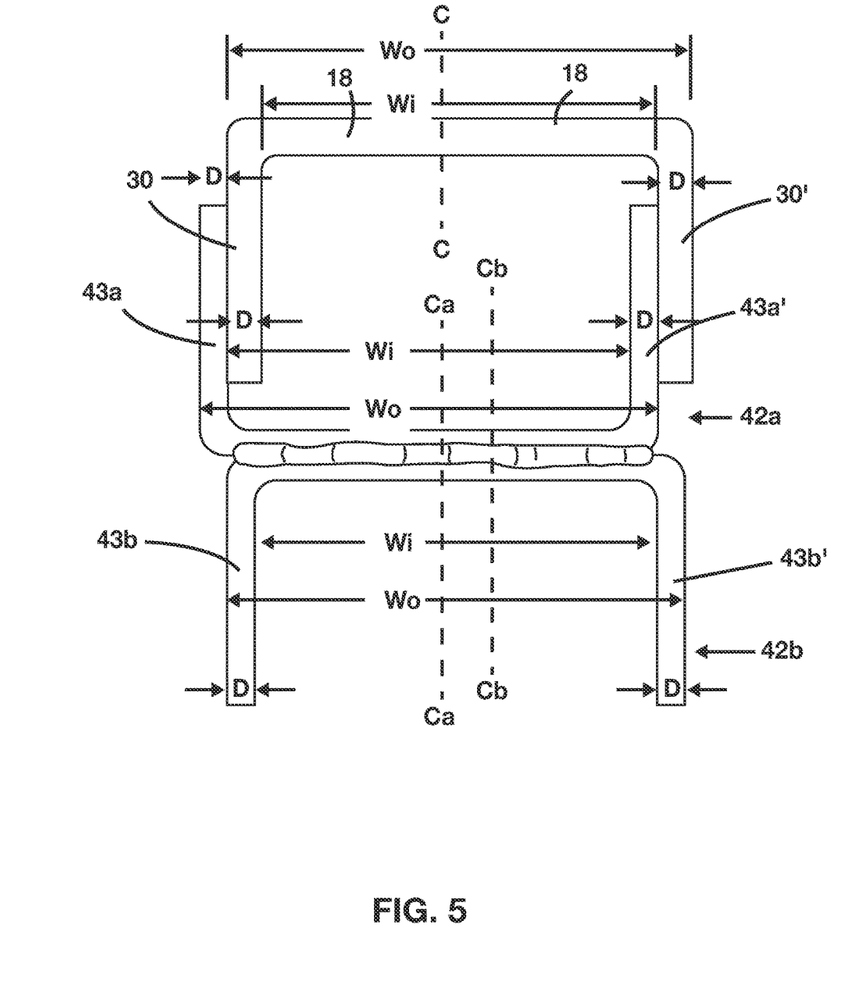
FIG. 5 is a top plan view showing the channel riser of FIG. 2 positioned within the vertical channel of a trailer coupler assembly so that the riser can be mounted to the vertical channel.

Referring to FIGS. 2-5, the channel riser 40 has the general shape of an I-beam that defines two opposing channel portions 42a, 42b, each of which has a general U-shape in transverse section. Channel portion 42a is formed by two opposing riser channel sidewalls 43a, 43a', and a riser inner wall 46a with a channel opening 44a facing outward from the inner wall 46a. Similarly, channel portion 42b is formed by two opposing riser channel side walls 43b, 43b' and a riser inner wall 46b with a channel opening 44b facing outward from the inner wall 46b. Each of the riser channel portions 42a, 42b has an outer width Wo that corresponds to the outer width of the vertical channel 18 and an inner width Wi that corresponds to the width Wi of the vertical channel opening 19 (i.e., the interior of the vertical channel 18) The inner width Wi is a standard dimension in the trailer industry suitable for receiving standard industry couplers so that such couplers can be used interchangeably. As shown in FIGS. 4 and 5, the centerlines Ca-Ca, Cb-Cb of channel portions 42a, 42b are offset from each other by a distance D, which corresponds to the width of each of the sidewalls 30, 30' of the vertical channel 18 as well as the width of the riser channel sidewalls 43a, 43a' (see FIG. 5). By using an I-beam structure, the channel riser 40 can be fabricated so that its bending strength surpasses that of the trailer tongue 6. By offsetting the riser channel portions 42a, 42b from each other as described above, the channel riser 40 can be mounted to the vertical channel 18 so that the centerline C-C of the vertical channel 18 (see FIG. 5) aligns with the centerline of the coupler 20 when it is mounted to the channel riser 40.

Still referring to FIGS. 2-5, the side wall 43a of riser channel portion 42a has a series of transverse holes 45a that are suitably spaced at vertical intervals, and are horizontally registered with the transverse holes 45a' on the opposing side wall 43a' to receive pins or bolts 32 by which the riser 40 can be removably secured within the vertical channel 18 or by which the coupler body 20 can be removably secured to the riser 40 within the riser channel portion 42a. The tranverse holes 45a, 45a' can be vertically spaced at intervals that correspond with the vertical spacing of the transverse holes 31, 31' in the vertical channel 18, or the vertical spacing of the transverse holes 45a, 45a' can be different than the spacing intervals of the transverse holes 31, 31' and at different distances from one another for attainment of various positions of adjustment between the riser 40 and the vertical channel 18. To secure riser channel portion 42a in the vertical channel 18, at least one pair of the holes 45a, 45a' are to be mated or brought into register with a selected pair (or pairs) of holes 31, 31' in the vertical channel 18 after which a bolt or pin 32 (see FIG. 2) can be passed through the registering holes to secure the vertical channel 18 and the riser 40 in their assembled relationship. In this configuration, when the riser channel portion 42a is used to secure the riser 40 in the vertical channel 18, the mounting position of the riser 40 relative to the vertical channel 18 can be adjusted longitudinally without difficulty.

Similarly, the side wall 43b of the riser channel portion 42b has a series of transverse holes 45b that are suitably spaced at vertical intervals, and are horizontally registered with transverse holes 45b' on the opposing side wall 43b' to receive pins or bolts 32 by which the riser 40 can be removably secured within the vertical channel 18 or by which the coupler body 20 can be removably secured to the riser 40 within the riser channel portion 42b. The tranverse holes 45b, 45b' can be vertically spaced at intervals (as described above for transverse holes 45a, 45a' of side wall 43a) to attain various positions of adjustment between the riser 40 and the vertical channel 18. In this configuration, when the riser channel portion 42b is used to secure the riser 40 in the vertical channel 18, the mounting position of the riser 40 relative to the vertical channel 18 can be adjusted longitudinally without difficulty.

As discussed above, each of the riser channel portions 42a, 42b has an outer width Wo, which corresponds to the outer width Wo of the vertical channel 18 and an inner width Wi that corresponds to the inner width Wi of the vertical channel 18. As shown in FIG. 5, in this configuration, the riser 40 can be mounted to the vertical channel 18 by positioning the side wall 43a of the riser channel portion 42a outside the sidewall 30 of the vertical channel 18 and the opposing side wall 43a' of the riser channel portion 42a inside the corresponding opposite sidewall 30' of vertical channel 18. When assembled in this way, riser channel portion 42b will then face forward toward the tow vehicle 2 and the coupler 20 can be secured within riser channel portion 42b in the manner described above. Alternatively, the riser 40 can be mounted to the vertical channel 18 by positioning the side wall 43b' of the riser channel portion 42b outside the sidewall 30 of the vertical channel 18 and the opposing side wall 43b of the riser channel portion 42b inside the corresponding opposite sidewall 30' of vertical channel 18. When assembled in this way, riser channel portion 42a will then face forward toward the tow vehicle 2 and the coupler 20 can be secured within riser channel portion 42a in the manner described above.

Figure 6:
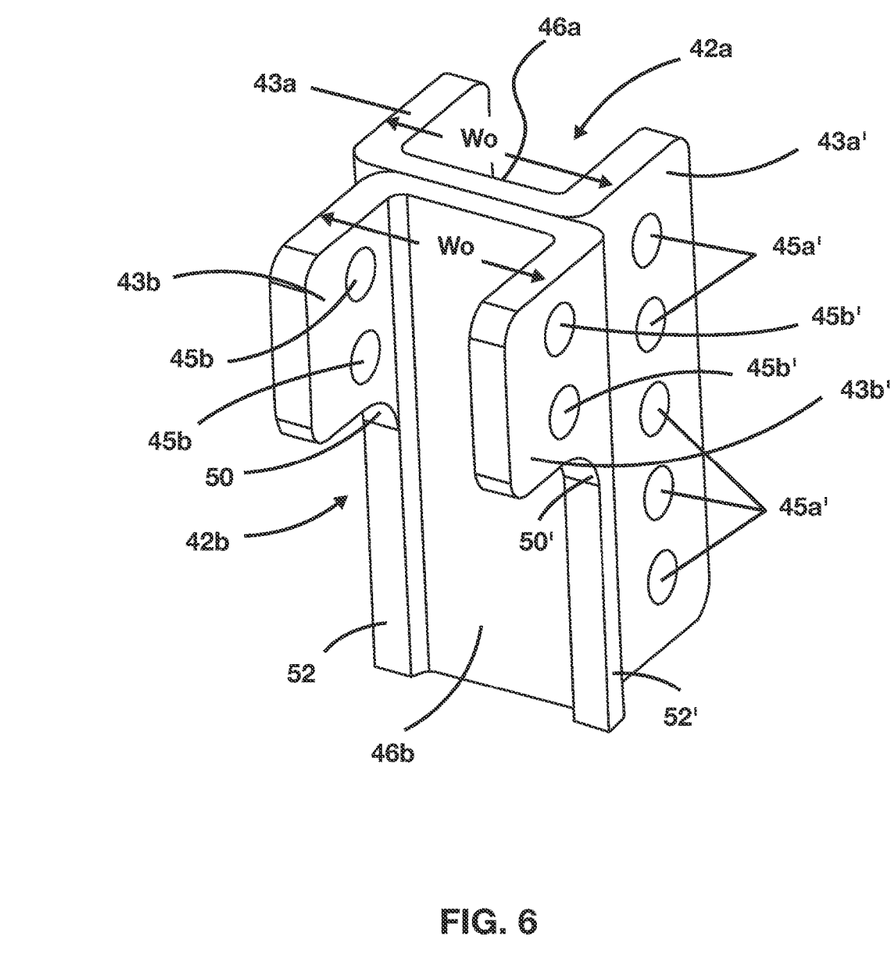
FIG. 6 is a perspective view of another embodiment of the channel riser according to the present invention, wherein the sidewalls of the second riser channel portion have cutouts.

Referring to FIG. 6, another embodiment of the channel riser 40 is shown. In this embodiment, the structure and dimensions of the channel riser 40 are similar to that of the embodiment shown in FIGS. 2-5, except that the riser channel side walls 43a, 43a' of riser channel portion 42a do not extend along the full length of the riser inner wall 46a. Rather, each of the sidewalls 43b, 43b' of the forward-facing riser channel 42b has a cutout 50, 50' (i.e., voids) to reduce the overall weight of the channel riser 40. A flange or rib 52, 52' extends along the length of each side of the riser inner wall 46a to provide rigidity to the channel riser 40.

Figure 7:
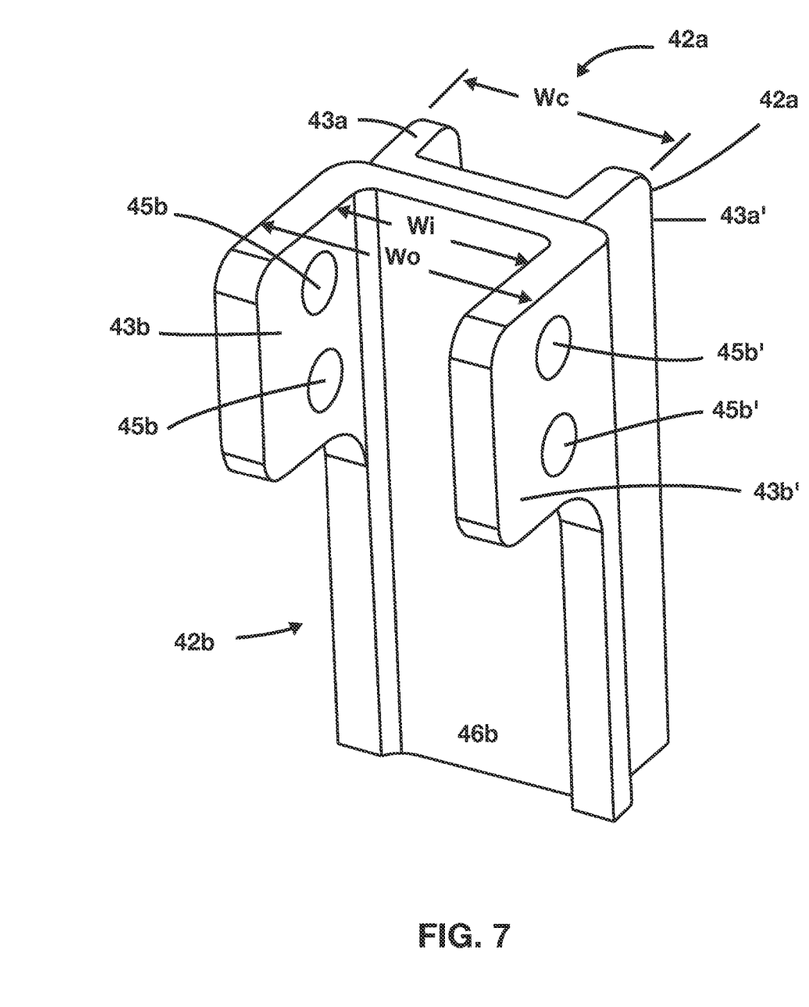
FIG. 7 is a perspective view of yet another embodiment of the channel riser according to the present invention, wherein the centerlines of both the first and second riser channel portions are aligned with each other.

Referring to FIG. 7, in another embodiment of the channel riser 40, each of the two opposing channel portions 42a, 42b have different widths and are disposed on a single centerline C-C, which can be in line with the centerline of the trailer 4. The forward-facing riser channel portion 42b has an outer width Wo corresponding to the outer width Wo of the vertical channel 18 and an inner width Wi corresponding to the inner width Wi of the vertical channel 18, as previously described. The rearward-facing riser channel 42a has a width Wc the corresponds to the width of the coupler body 22 and is slightly smaller than the inner width Wi of the vertical channel 18 (see FIG. 5) so that the reward facing riser channel 42a can be closely received within the vertical channel 18. In this configuration, the rearward-facing riser channel 42a also includes transverse holes 45a as previously described to receive pins or bolts 32 by which the riser channel portion 42a can be removably secured within the vertical channel 18.

In some embodiments of the channel riser 40, the channel portions 42a, 42b are made of steel with the holes drilled or punched and the channel riser 40 is fabricated by welding the two channel portions 42a, 42b together, although it will be understood that other suitable metal and methods of manufacture may be chosen.

Having read this disclosure, it will be understood by those having skill in the art that the trailer coupler adapter of the present invention provides a number of advantages over the prior art. It can be used to effectively and safely connect a trailer or other towed vehicle to a towing vehicle regardless of the relative heights of the towed vehicle and the towing vehicle and without having to use an expensive dropped ball mount. It is relatively inexpensive to manufacture and easy to use. It can be used to couple commercial trailers to relatively tall towing vehicles, including "lifted" trucks.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. An adapter for a trailer coupler assembly of a vehicle to be towed, the adapter comprising:
   an elongated riser member configured to be removably mounted to a vertical channel of a trailer coupler assembly, wherein the riser member has a transverse cross-section generally in the shape of an I-beam and includes a first channel portion and an opposing second channel portion;
   wherein the opposing second channel portion includes a generally U-shaped transverse cross-section configured to hold a trailer coupler for receiving a tow vehicle hitch ball; and
   wherein the first channel portion includes a generally U-shaped transverse cross-section and is configured to be removably mounted to the vertical channel of the trailer coupler assembly at one of a plurality of longitudinal positions along a length of the vertical channel of the trailer coupler assembly.

2. The adapter of claim 1, wherein the first channel portion comprises two opposing first channel side walls and a first channel inner wall, and the first channel portion defines a first channel opening facing outward from the first channel inner wall.

3. The adapter of claim 1, wherein the second channel portion comprises two opposing second channel side walls and a second channel inner wall and the second channel portion defines a second channel opening facing outward from the second channel inner wall.

4. The adapter of claim 1, wherein the transverse cross-section of the first channel portion is disposed about a first channel center line, the transverse cross-section of the second channel portion is disposed about a second channel center line, and the first channel center line and the second channel center line are offset from each other.

5. The adapter of claim 1, wherein the first channel portion includes two opposing first channel sidewalls, each of which includes a plurality of transverse holes spaced longitudinally along a length of the first channel portion, and wherein each of the plurality of holes in one of the first channel sidewalls is transversely registered with one of the plurality of holes in the opposing first channel sidewall.

6. The adapter of claim 1, wherein at least one of the first channel portion and the second channel portion has an outer width corresponding to an outer width of the vertical channel of the trailer coupler assembly and an inner width corresponding to an inner width of the vertical channel of the trailer coupler assembly.

7. The adapter of claim 1 wherein the transverse cross-section of the first channel portion is disposed about a first channel center line, the transverse cross-section of the second channel portion is disposed about a second channel center line, and the first channel center line and the second channel center lines are aligned with each other.

8. The adapter of claim 3 wherein at least one of the second channel side walls defines a cutout and the second channel inner wall includes a rib extending along at least a portion of the length of the cutout.

9. The adapter of claim 1 wherein each of the first channel portion and the second channel portion has an outer width corresponding to an outer width of the vertical channel of the trailer coupler assembly and an inner width corresponding to an inner width of the vertical channel of the trailer coupler assembly.

10. A trailer coupler assembly of a vehicle to be towed, the assembly comprising:
    a trailer vertical channel mounted to a vehicle to be towed;
    an elongated riser member removably mounted to the trailer vertical channel, wherein the riser member has a transverse cross-section generally in the shape of an I-beam and includes a first channel portion and an opposing second channel portion;
    wherein the first channel portion includes a generally U-shaped transverse cross-section and is removably mounted to the trailer vertical channel at one of a plurality of longitudinal positions along a length of the trailer vertical channel; and
    wherein the opposing second channel portion includes a generally U-shaped transverse cross-section configured to hold a trailer coupler for receiving a tow vehicle hitch ball.

11. The trailer coupler assembly of claim 10, wherein the first channel portion comprises two opposing first channel side walls and a first channel inner wall, and the first channel portion defines a first channel opening facing outward from the first channel inner wall.

12. The trailer coupler assembly of claim 11, wherein the second channel portion comprises two opposing second channel side walls and a second channel inner wall, and the second channel portion defines a second channel opening facing outward from the second channel inner wall.

13. The trailer coupler assembly of claim 10, wherein the transverse cross-section of the first channel portion is disposed about a first channel center line, the transverse cross-section of the second channel portion is disposed about a second channel center line, and the first channel center line and the second channel center line are offset from each other.

14. The trailer coupler assembly of claim 10, wherein the first channel portion includes two opposing first channel sidewalls, each of which includes a plurality of transverse holes spaced longitudinally along the length of the first channel portion, and where each of the plurality of holes in one of the first channel sidewalls is transversely registered with one of the plurality of holes in the opposing first channel sidewall.

15. The trailer coupler assembly of claim 10, wherein at least one of the first channel portion and the second channel portion has a width corresponding to the width of the trailer vertical channel.

16. The trailer coupler assembly of claim 10 wherein the transverse cross-section of the first channel portion is disposed about a first channel center line, the transverse cross-section of the second channel portion is disposed about a second channel center line, and the first channel center line and the second channel center lines are aligned with each other.

17. The trailer coupler assembly claim 12 wherein at least one of the second channel side walls defines a cutout and the second channel inner wall includes a rib extending along at least a portion of a side of the cutout.

18. The adapter of claim 10 wherein each of the first channel portion and the second channel portion has an outer width corresponding to an outer width of the vertical channel of the trailer coupler assembly and an inner width corresponding to an inner width of the vertical channel of the trailer coupler assembly.

19. An adapter for a trailer coupler assembly of a vehicle to be towed, the adapter comprising:
    an elongated riser member configured to be removably mounted to a vertical channel of a trailer coupler assembly, wherein the riser member has a transverse cross-section generally in the shape of an I-beam and includes a first channel portion and an opposing second channel portion;

wherein the opposing second channel portion includes a generally U-shaped transverse cross-section configured to hold a trailer coupler;

wherein the first channel portion includes a generally U-shaped transverse cross-section and is configured to be removably mounted to a vertical channel of a trailer coupler assembly at one of a plurality of longitudinal positions along a length of the vertical channel of the trailer coupler assembly; and wherein the transverse cross-section of the first channel portion is disposed about a first channel center line, the transverse cross-section of the second channel portion is disposed about a second channel center line, and the first channel center line and the second channel center line are offset from each other.

20. An adapter for a trailer coupler assembly of a vehicle to be towed, the adapter comprising:

an elongated riser member configured to be removably mounted to a vertical channel of a trailer coupler assembly, wherein the riser member has a transverse cross-section generally in the shape of an I-beam and includes a first channel portion and an opposing second channel portion;

wherein the opposing second channel portion includes a generally U-shaped transverse cross-section configured to hold a trailer coupler;

wherein the first channel portion includes a generally U-shaped transverse cross-section and is configured to be removably mounted to a vertical channel of a trailer coupler assembly at one of a plurality of longitudinal positions along a length of the vertical channel of the trailer coupler assembly;

wherein the second channel portion comprises two opposing second channel side walls and a second channel inner wall, and the second channel portion defines a first channel opening facing outward from the second channel inner wall; and wherein at least one of the second channel side walls defines a cutout and the second channel inner wall includes a rib extending along at least a portion of a side of the cutout.

21. An adapter for a trailer coupler assembly of a vehicle to be towed, the adapter comprising a trailer vertical channel mounted to a vehicle to be towed;

an elongated riser member removably mounted to the trailer vertical channel, wherein the riser member has a transverse cross-section generally in the shape of an I-beam and includes a first channel portion and an opposing second channel portion;

wherein the first channel portion includes a generally U-shaped transverse cross-section and is removably mounted to the trailer vertical channel at one of a plurality of longitudinal positions along a length of the trailer vertical channel; and wherein the opposing second channel portion includes a generally U-shaped transverse cross-section configured to hold a trailer coupler; and wherein the transverse cross-section of the first channel portion is disposed about a first channel center line, the transverse cross-section of the second channel portion is disposed about a second channel center line, and the first channel center line and the second channel center line are offset from each other.

22. An adapter for a trailer coupler assembly of a vehicle to be towed, the adapter comprising:

a trailer vertical channel mounted to a vehicle to be towed;

an elongated riser member removably mounted to the trailer vertical channel, wherein the riser member has a transverse cross-section generally in the shape of an I-beam and includes a first channel portion and an opposing second channel portion;

wherein the first channel portion includes a generally U-shaped transverse cross-section and is removably mounted to the trailer vertical channel at one of a plurality of longitudinal positions along a length of the trailer vertical channel; and wherein the opposing second channel portion includes a generally U-shaped transverse cross-section configured to hold a trailer coupler;

wherein the second channel portion comprises two opposing second channel side walls and a second channel inner wall, and the second channel portion defines a second channel opening facing outward from the second channel inner wall; and wherein at least one of the second channel side walls defines a cutout and the second channel inner wall includes a rib extending along at least a portion of a side of the cutout.

* * * * *